(12) United States Patent
Rayner et al.

(10) Patent No.: US 11,741,410 B2
(45) Date of Patent: Aug. 29, 2023

(54) CENTRALIZED CLOUD SERVICE MANAGEMENT

(71) Applicant: SKYKICK, INC., Seattle, WA (US)

(72) Inventors: Christopher Rayner, Seattle, WA (US); Evan Richman, Seattle, WA (US); Bradley Younge, Denver, CO (US); Robert P. Karaban, Rochester Hills, MI (US); John Dennis, Oakland, CA (US); Todd Schwartz, Seattle, WA (US); Darren D. Peterson, Redmond, WA (US); Peter Joseph Wilkins, Troy, MI (US); Matthew Steven Hintzke, Woodinville, WA (US); Sergii Semenov, Kirkland, WA (US); Alex Zammitt, Riverview, MI (US); Philip Pittie, Seattle, WA (US)

(73) Assignee: SkyKick, Inc., Seattle, WA (US)

( * ) Notice: Subject to any disclaimer, the term of this patent is extended or adjusted under 35 U.S.C. 154(b) by 278 days.

(21) Appl. No.: 17/152,780

(22) Filed: Jan. 19, 2021

(65) Prior Publication Data
US 2021/0226957 A1    Jul. 22, 2021

Related U.S. Application Data

(60) Provisional application No. 62/963,024, filed on Jan. 18, 2020.

(51) Int. Cl.
*H04L 29/06* (2006.01)
*G06Q 10/0631* (2023.01)
(Continued)

(52) U.S. Cl.
CPC ....... *G06Q 10/06315* (2013.01); *G06F 16/22* (2019.01); *G06F 16/288* (2019.01);
(Continued)

(58) Field of Classification Search
CPC .. G06Q 10/06315; G06Q 50/10; G06F 16/22; G06F 16/288; G06F 16/9024;
(Continued)

(56) References Cited

U.S. PATENT DOCUMENTS 6,349,321 B1   2/2002   Katayama
8,856,382 B2   10/2014  Akolkar et al.
(Continued)

OTHER PUBLICATIONS

U.S. Appl. No. 17/152,778, "Non Final Office Action", dated Sep. 6, 2022, 14 pages.
(Continued)

*Primary Examiner* — Baotran N To
(74) *Attorney, Agent, or Firm* — Kilpatrick Townsend & Stockton LLP

(57) ABSTRACT

In one aspect, just-in-time authentication is provided to assist an administrator or staff of an IT service end user to invoke a function call to a service. The just-time-authentication can provide on-the-fly authentication to the service. In another aspect, granular permissions in executing a task or tasks for a service is enabled for a given administrator or staff of an IT service end user. In some embodiments, the granular permission involves assigning permissions to users either directly or indirectly via a mediating abstraction (such as groups, roles, etc.). Still in another aspect, stateful execution of a command/function call to a service is provided. In the stateful execution, the command/function call to the service is associated with a key, which can comprise a session id, a function name, a count of function executions for current session, and hash of input parameters for the command/function call, and/or any other information.

18 Claims, 10 Drawing Sheets

(51) Int. Cl.
*G06Q 50/10* (2012.01)
*H04L 9/40* (2022.01)
*H04L 67/14* (2022.01)
*G06F 16/22* (2019.01)
*G06F 16/28* (2019.01)
*G06F 16/901* (2019.01)

(52) U.S. Cl.
CPC ......... *G06F 16/9024* (2019.01); *G06Q 50/10* (2013.01); *H04L 63/102* (2013.01); *H04L 63/105* (2013.01); *H04L 63/20* (2013.01); *H04L 67/14* (2013.01)

(58) Field of Classification Search
CPC ..... H04L 63/102; H04L 63/105; H04L 63/20; H04L 67/14; H04L 63/0807
See application file for complete search history.

(56) References Cited

U.S. PATENT DOCUMENTS

| | | | |
|---|---|---|---|
| 8,909,622 | B1 | 12/2014 | Emigh et al. |
| 9,172,621 | B1 | 10/2015 | Dippenaar |
| 9,626,720 | B2 | 4/2017 | Robbin et al. |
| 9,930,103 | B2 * | 3/2018 | Thompson ............... H04L 67/10 |
| 10,397,232 | B2 * | 8/2019 | Hashmi ............... G06F 9/45533 |
| 10,572,935 | B1 | 2/2020 | Murray et al. |
| 2005/0240621 | A1 | 10/2005 | Robertson et al. |
| 2006/0178918 | A1 | 8/2006 | Mikurak |
| 2007/0294663 | A1 | 12/2007 | McGuire et al. |
| 2009/0164933 | A1 | 6/2009 | Pederson et al. |
| 2010/0131942 | A1 | 5/2010 | Nannenga et al. |
| 2011/0099147 | A1 | 4/2011 | McAlister et al. |
| 2011/0119257 | A1 | 5/2011 | Rajasekhar |
| 2014/0258910 | A1 | 9/2014 | Liang et al. |
| 2014/0278754 | A1 | 9/2014 | Cronin et al. |
| 2016/0301739 | A1 * | 10/2016 | Thompson ............ H04L 67/561 |
| 2018/0309819 | A1 | 10/2018 | Thompson |
| 2019/0068627 | A1 | 2/2019 | Thampy |
| 2019/0379672 | A1 * | 12/2019 | Hashmi ................ H04L 63/102 |
| 2020/0026397 | A1 | 1/2020 | Wohlstadter et al. |
| 2020/0374308 | A1 | 11/2020 | Chen et al. |
| 2021/0149851 | A1 | 5/2021 | Belezko et al. |

OTHER PUBLICATIONS

U.S. Appl. No. 17/152,787, Non-Final Office Action, dated Jul. 5, 2022, 24 pages.

Varia, "Architecting for the Cloud: Best Practices", Amazon Web Services, Available Online at: https://engineering.purdue.edu/ee695b/public-web/handouts/References/AWS_Cloud_Best_Practices.pdf, Jan. 2011, pp. 1-23.

U.S. Appl. No. 17/152,778, Final Office Action, dated Apr. 13, 2022, 13 pages.

U.S. Appl. No. 17/152,778, Non-Final Office Action, dated Sep. 20, 2021, 15 pages.

U.S. Appl. No. 17/152,787, "Final Office Action", dated Jan. 17, 2023, 24 pages.

U.S. Appl. No. 17/152,778, "Final Office Action", dated Mar. 6, 2023, 14 pages.

* cited by examiner

CENTRALIZED CLOUD SERVICE MANAGEMENT

CROSS-REFERENCES TO RELATED APPLICATIONS

This application claims the priority to U.S. Provisional Patent Application No. 62/963,024, filed on Jan. 18, 2020, entitled with "CENTRALIZED CLOUD SERVICE MANAGEMENT", which is hereby incorporated by reference in its entirety for all purposes.

BACKGROUND OF THE INVENTION

Modern companies and associated IT services need to manage the software services that the companies provide to employees. This process can involve provision of a variety of computer services from a variety of vendors to employees of a company. IT consulting firms can be hired by companies to manage the IT environment for a company. The services can often have various differing user interfaces and data formats, which can require a high level of overhead to manage.

Onboarding process is commonly referred to a series steps to add a new employee to a company's system(s) and to facilitate the new employee to be able to perform his/her job at the company. Before the new employee starts at the company, this process typically involves administrative steps typically beginning with the IT service of the company receiving a ticket to add this new employee to the company's system(s). This typically involves adding the new employee to the payroll system, assigning a network ID to the new employee, and assigning an email address to the new employee. After these initial administrative steps, the onboarding process may involve determining which system(s) and/or network(s) the new employee should be able to access and not be able to access; and privilege and power the new employee should have on the system(s) and network(s) the new employee will have access to. These determinations will help create appropriate access level(s) and security level(s) for the new employees within the company's system(s). Then, the onboarding process may involve determinations which applications, software, and/or type of computing/communication device the new employee should use.

Different employees may need various access rights to different software services, and those access rights can vary based on for example an employee's role. For example, certain employees should be provided with different access to software services. However, the recognition of and management of groups of users as opposed to individual users can be challenging. The new employee's role typically includes one or more departments/groups the new employee will be in, one or more job tasks/functions the new employee will perform, one or more positions of this new employee in the company and/or within the departments/groups this new employee will be assigned to. For example, a new employee at accounting department holding a manager position will have a very different set up in the onboarding process than a new employee at sales department as a sales representative for the company.

Employee Onboarding system typically enables the IT service of the company to automate some of the repetitive and tedious manual creation of the new employee in the company's system(s) and automatically provisioning tasks to onboard new employees. Some conventional employee onboarding systems provide graphical tools for drawing workflows, but typically lack a well-defined structure. It could be a challenge to get a very specific protracted outcome using those tools. Also, some of the conventional employee onboarding systems are too general and do not provide enough functionality to improve/automate the onboarding process.

Embodiments of the invention address these and other problems, individually and collectively.

BRIEF SUMMARY OF THE INVENTION

In one aspect of the present disclosure, just-in-time authentication is provided to assist an administrator or staff of an IT service end user to invoke a function call to a service. In some embodiments, the just-in-time authentication involves determining whether the administrator or staff of an IT service end user has an active access to the service; and if this access does not exist, the just-in-time authentication triggers an authentication process for the administrator or staff of an IT service end user to have an active access to the service. In any case, once the administrator or staff of an IT service end user has the active access to the service, appropriate API calls are made in accordance with the function call invoked by the administrator or staff of an IT service end user.

In another aspect of the present disclosure, granular permissions in executing a task or tasks for a service is enabled for a given administrator or staff of an IT service end user. In some embodiments, the granular permission involves assigning permissions to users either directly or indirectly via a mediating abstraction (such as groups, roles, etc.). Execution of the task or tasks for the service may involve executing one or more commands and/or function calls provided by the service. These commands and/or function calls may be listed as securable resources in a controlled manner such that when they are to be executed, permissions of the administrator or staff of an IT service end user executing them are checked. This ala-carte approach for executing the task or tasks by the administrator or staff of an IT service end user can provide flexibility and control to the IT service end user in terms of enabling the IT service end user to manage its staff when providing IT service to its customers.

Still in another aspect of the present disclosure, stateful execution of a command/function call to a service is provided. In the stateful execution, the command/function call to the service is associated with a key, which can comprise a session id, a function name, a count of function executions for current session, and hash of input parameters for the command/function call, and/or any other information. Output of a given execution of the command/function call to the service can be stored. Before a subsequent execution of the command/function call to the service, the aforementioned key is checked to determine whether the stored output of the command/function call in a previous run may be used. This can avoid server trips and/or repeated execution of the same command/function call to the service, and thus improve efficiency in providing IT service to a customer of the IT service end user.

A better understanding of the nature and advantages of embodiments of the present disclosure may be gained with reference to the following detailed description and the accompanying drawings.

BRIEF DESCRIPTION OF THE DRAWINGS

FIG. 1 is a system diagram showing an example environment where an example management system in accordance with the disclosure is applied in.

DETAILED DESCRIPTION OF THE INVENTION

Information Technology Service Management (ITSM) are the activities that are performed by an organization to design, plan, deliver, operate and control information technology (IT) services offered to clients of the organization. An information technology service management system ("management system" hereafter) in accordance with the present disclosure can facilitate an IT service provider to provide IT service to a customer of the IT service provider. In some embodiments, the management system in accordance with the present disclosure can provide a set of tools to enable the IT service provider to provide the IT service to the customer. The IT service provided by the IT service provider to the customer may include system/user administration, cloud service administration, cloud platform or infrastructure management, and/or any other services provided by the IT service provider to the customer. The management system in accordance with the disclosure can facilitate integrated access to one or more services employed by the customer of the IT service provider by collecting data related to for example, passwords, licenses, schedules, health, analytics, and general data that is stored within or provided by the services. The management system in accordance with the disclosure can collect this data in a cross-service fashion and provide it in one or more simplified user interfaces to allow for easier management of the services through the management system.

I. Example System Architecture

Figure 1:
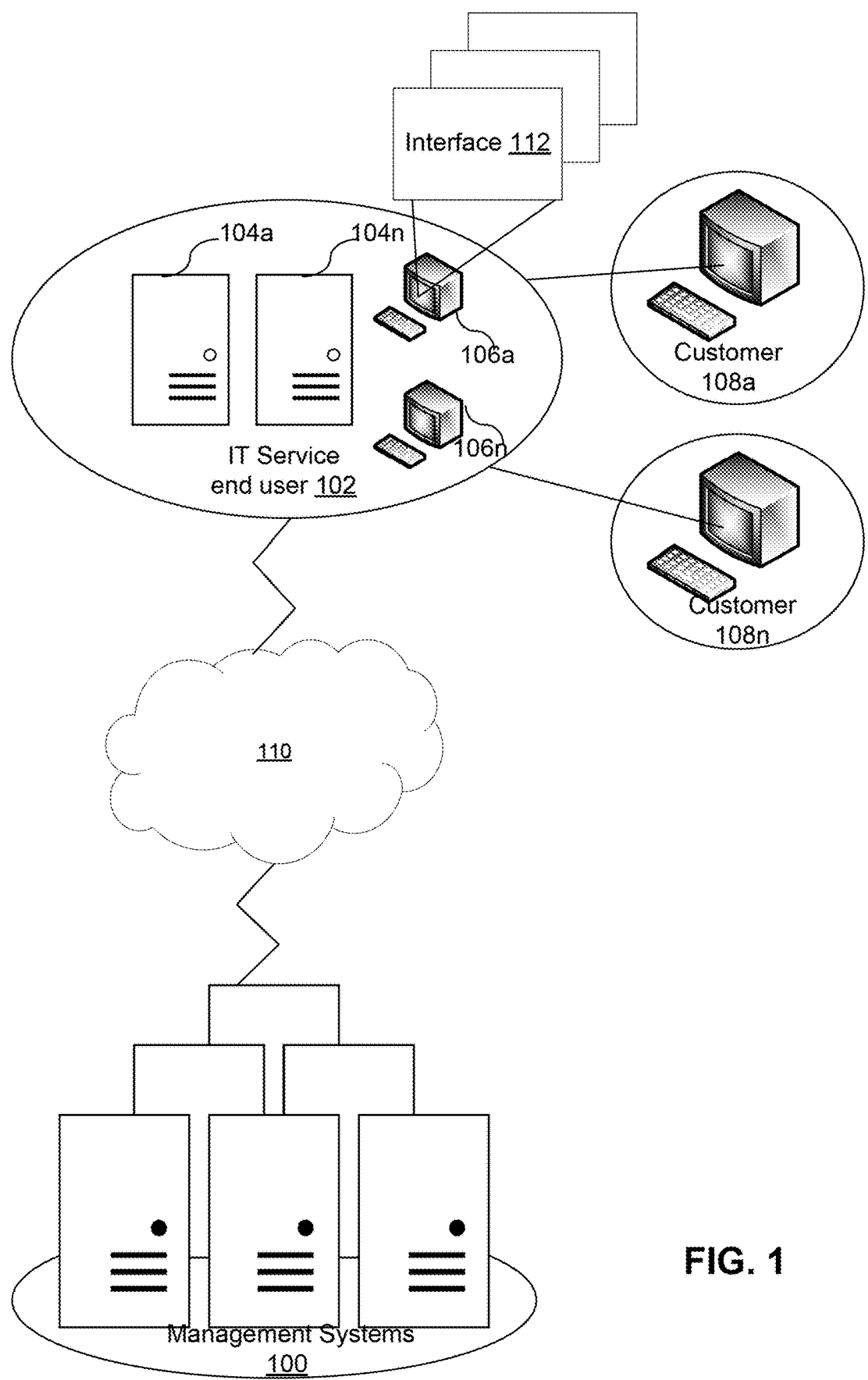

FIG. 1 is a system diagram showing an example environment where an example management system in accordance with the disclosure is applied in. As shown, the example environment can include an example management system 100. The example management system 100 can be configured to provide one or more software services to an IT servicer end user 102 to enable the IT service end user 102 to provision one or more IT and/or computing services to one or more customers of the IT end user 102, such as customers 108a to 108n as shown in this example. Although only one the IT service end user 102 is shown in FIG. 1, it should be understood that the management system 100 may be configured to provide the aforementioned software services to more than one the IT service end user 102. The IT service end user 102 can be an internal IT organization or an external IT services company or even individual person. The recipients of services provided by IT service end user, e.g., the customers 108a to 108n shown in this example, can be a line of business (LOB) organization within an enterprise, an entire company, a department within an entity, a store, a facility, and/or any other entities. For example, the IT service end user 102 can be a specialized IT service company that provides help-desk type service to multiple companies. As another example, IT service end user 102 can be an IT department within a company/or enterprise. By providing the aforementioned software services, the manage system 100 can assist the IT service end user 102 to place greater emphasis on the needs and the outcomes required by the business to improve employee. In some implementations, the software services may be provided by the management system 100 through one or more interfaces that can be accessed by the terminal(s) of the IT service end user 102, such as the interfaces 112 shown in FIG. 1.

As shown, the IT service end user 102 may employ one or more systems such as system 104a to 104n as shown in this example to facilitate the IT service provided to its customers 108a-n. Such system(s) can enable the IT service end user 102 to provision the one or more IT and/or computing services to the customers 108a-n of the IT service end user 102. The IT service end user 102 may include one or more terminals, such as terminal 106a to 106n shown in this example. Such terminal(s) can enable a user in the IT service end user 102 to interface with the management system 100 for provisioning the IT and/or computing services to the customers 108a-n.

As shown, one or more of the systems 104a-n and/or terminals 106a-n of the IT service end user 102 may be connected with the management system 100 through a network/cloud 110. The connections between the example management system 100 may be various, which may include internet, intranet (wireless or wired), and/or any other suitable connections. As mentioned above, the IT service end user 102 may be internal or external to a given customer, such as customer 108a or client 108n. When the IT service end user 102 is internal to the client, the connection(s) may be through one or more intranets of the customer; and when it is external to the customer, the connection(s) may be through the Internet.

Traditionally, IT service provided to a given customer, e.g., customer 108a, by the IT service end user 102 typically involves collecting relevant data from the customer 108a and/or service providers of customer 108a, and provide system/service/user administration based on the data collected. Using user administration as an example, customer 108a may have a set of users internal to the customer 108a (e.g., sales department of customer 108a), and customer 108a may employ multiple cloud/software services for these users. Traditionally, user management in this scenario would involve user management for customer 108a, and user management for each individual cloud/software service. For instance, if a user is to be added to the sales department of customer 108a, not only is a user management action of adding the user to the sales department group of customer 108a (e.g., a user group called "sales" created for customer 108a) needed, but also is it needed for the individual cloud/software service. The user management action may involve supply new user information such as the user's first and last name, phone number, organization email address, age, one or more departments/groups the user belongs to, and/or any other information. Each individual software/cloud service may also need its idiosyncratic information for fulfilling the software/cloud service to this new user. This process can thus be laborious and tedious especially when a large amount of users need be add/deleted/edited within customer 108*a*. The complexity of IT service tasks for customer 108*a* can drastically increase when multiples steps and services are involved.

Figure 2:
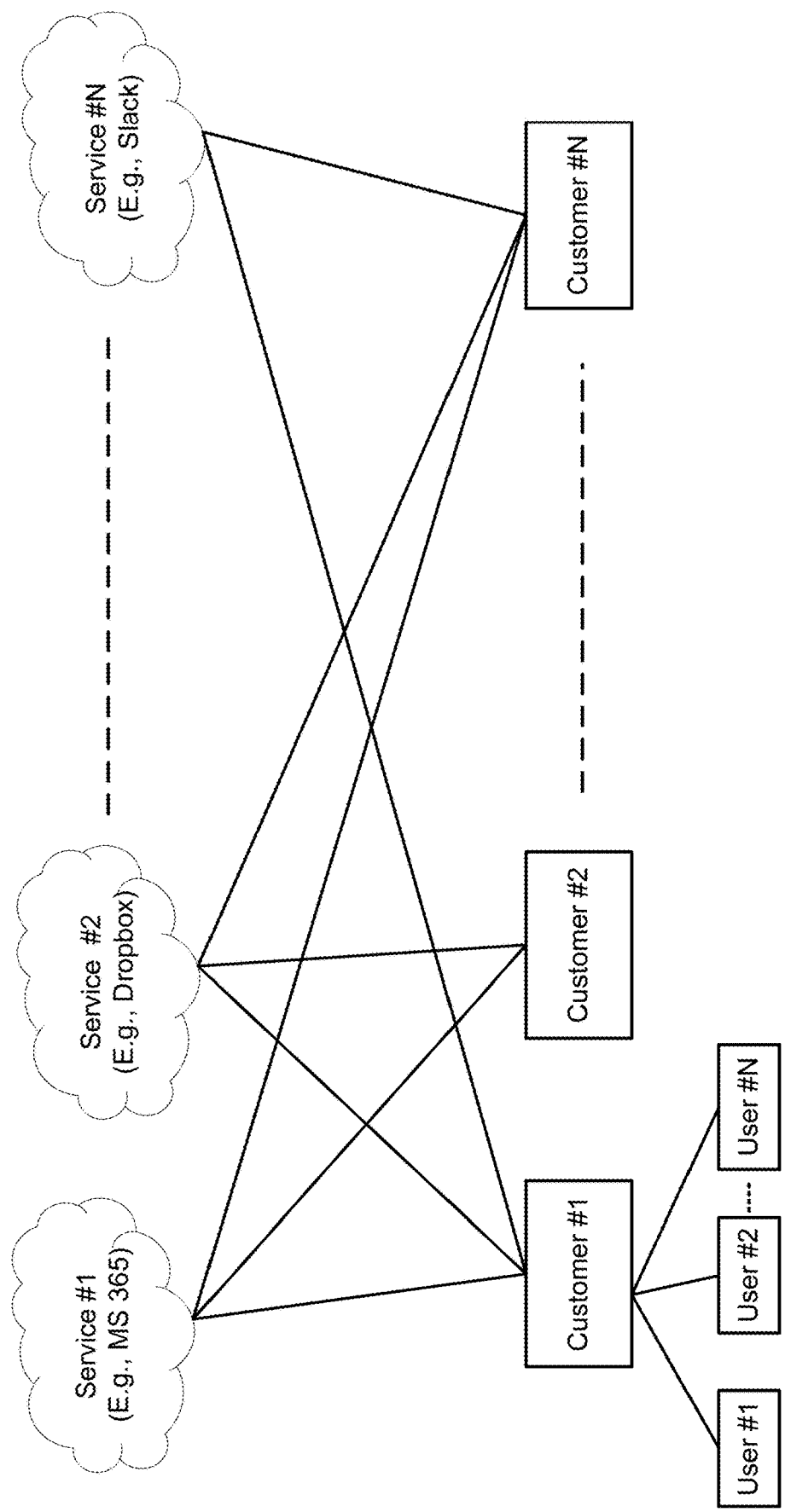
FIG. 2 illustrates an example of client-service relations in accordance with the present disclosure.

FIG. 2 illustrates an example of customer-service relations for the IT service end user 102 in accordance with the present disclosure. Typically, a customer of the IT service end user 102, such as customer 108*a*, may subscribe to many cloud services. For example, customer #1 may subscribe to service #1 (e.g., Microsoft Office 365), service #2 (e.g., Dropbox), and/or service #N (e.g., Slack). In some implementations, customer #1 may have different users subscribing to different services depending on, for example, corporate management policies and service subscription agreements. For example, customer #1 may hire a new employee user #1 for its sales department. User #1 is supposed to subscribe to service #1 and service #2 to perform for his business role. In the onboarding procedure, the IT department of customer #1 equipped with a conventional management system must configure service #1 and service #2 for user #1 separately. Personal information of user #1 required for configuration of service #1 must be repeated for configuration of service #2. If user #1 transfers to another department where service #3 is required, the IT department of customer #1 equipped with the conventional management system must repeat the configuration process again to input the personal information of user #1. With the growth of customer #1, user number may increase dramatically. The repeated configuration process may consume considerable resources of customer #1. In some implementations, a management system based on a graph database is proposed to reduce the repeated configuration process.

II. Just-In-Time Authentication

One insight provided by this present disclosure is that invocation, by an administrator or staff of an IT service end user ("user" for ease of description hereinafter), of a command/function call ("command" for ease of description hereinafter) to a software/cloud services ("service" or "services" for ease of description hereinafter) may be authenticated just-in-time. In the example IT service environment illustrated in FIG. 1 and FIG. 2, an administrator or staff of an IT service end user 102—user typically would run tasks involving multiple services. For example, the user may run a script that involves invoking commands to multiple services. As an illustration, for instance, the user may run a script to get user information across multiple services and store the user information in association with individual users of a given customer such as customer 108*a*. As another example, the user may invoke a command to get certain information from service #1, another command to make changes to certain assets in service #2, still another command to make changes to certain assets in service #3, and then a command to make changes to assets in service #1. That is, for the IT service end user 102 to provide IT service to multiple customers and manage multiple services for those customers, authentication of an administrator or staff of an IT service end user (user) into those services can be tedious. Traditionally, the user would have to log into service #1 to run commands to service #1, logs out of service #1, logs into service #2 to run commands to service #2, logs out of service #2, logs into service #3 to run commands to service #3, logs out of service #3, and logs into service #1 to run commands to service #1 for the scenario described above. As can be seen, this can be very tedious for the user.

In accordance with the disclosure, just-in-time authentication of an administrator or staff of an IT service end user (user) is provided. In this way, authentication to a particular service can be achieved on the fly as the user executes a command or commands to the particular service. The user therefore would not have to manually authenticate itself repeatedly as it moves from service to service executing commands across different services as described above.

Figure 3:
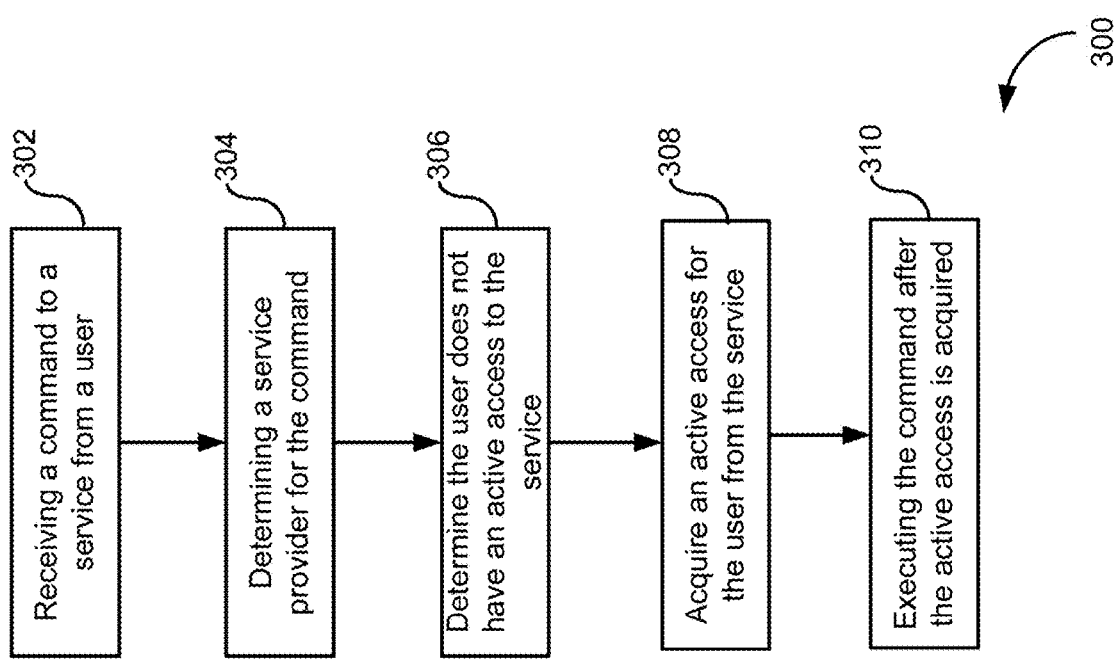
FIG. 3 shows an example method for just-in-time authentication of administrator or staff of an IT service end user according to the present disclosure.

FIG. 3 shows an example method 300 for just-in-time authentication of administrator or staff of an IT service end user according to the present disclosure. The operations of method 300 presented below are intended to be illustrative. In some embodiments, method 300 may be accomplished with one or more additional operations not described and/or without one or more of the operations discussed. Additionally, the order in which the operations of method 300 are illustrated in FIG. 3 and described below is not intended to be limiting.

In some embodiments, method 300 may be implemented in the management system 100 and/or one or more systems 104*a*-104*n* shown in FIG. 1, which may each include one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be designed for execution of one or more of the operations of method 300.

At 302, a command to a service is received from a user. In accordance with the present disclosure, the command received at 302 does not necessarily have to be a single function call to the service. In various embodiments, the command received at 302 may include more than one function call to the service. For example, the command received at 302 may be a script comprising multiple function calls to the service. In one implementation, the command may be received from the user through a command line interface such as the interface shown in FIG. 5.

At 304, a provider of the service may be determined in response to the command having been received at 302. In implementation, this may be done automatically. For example, a set of commands associated with the service may have syntax specific to that service. When one of those commands is received, the provider of that service can be determined automatically because of the syntax of the command identifies the provider of the service. However, this is not necessarily the only case. In some embodiments, the provider of the service may be determined because certain parameters are provided in the command by the user. For example, if a service specific parameter is provided by the user, the provider of that service may also be identified. In yet some other embodiments, the user itself may identify the provider of the service before invoking the command. Other implementations of 304 are contemplated.

At 306, the user is determined not to have an active access to the service for which the command received at 302 is invoked. As mentioned above, the just-in-time authentication in accordance with the disclosure does not require the user to have the active access to the service when the command is invoked. Traditionally, the user would have to log into the service in advance of invoking the command to acquire the active access with the service. But in this method, the user can invoke the command without being conscious of whether he/she has an active access to the service.

At 308, an active access to the service is acquired for the user in response to the determination at 306. In one implementation, the active access may be acquired from a cache on the management system 100. In another implementation, the user may be directed to an authentication mechanism provided by the service provider identified at 304 such that the user may authenticate itself to the service to acquire the active access. Other implementations of 308 are contemplated At 310, the command received at 302 is executed after the active access to the service is acquired at 308. In implementations, this may involve generating one or more API or function calls to the service.

With just-in-time authentication having been generally described, attention is now directed to one embodiment of just-in-time authentication in accordance with the present disclosure.

Proxy Module and Access Token

In some embodiments, for achieving the just-in-time authentication in accordance with the disclosure, a proxy module technique is employed. In this technique, a proxy module is created for a command to a particular service. For example, without limitation, the command may be a get-user call of MS 365 such that when this command is invoked, a list of users and their user information will be returned from MS 365. This command may be provided by MS 365 as a standard API call to MS 365. In those embodiments, a corresponding proxy module is created on the management 100 for this command such that when management 100 receives this command from the user, it automatically substitutes this command with the corresponding proxy module. In this embodiment, proxy modules may be created for individual commands to a given service on the management system 100. Within a given proxy module, intelligence for achieving the just-in-time authentication can be implemented.

In those embodiments, the intelligence for the just-in-time authentication within the proxy module may involve calling token service implemented by the management system for different services. The token service can determine an appropriate way to acquire an access token to the service for the user. One way would be directing the user to an authentication mechanism provided by the service provider and having the user authenticate itself to the service. Another way would be acquiring the access token automatically from the service on behalf of the user. Typically an access token issued by the service expires after a period of time and user is required to authenticate itself again to the service. In some embodiments, the service may provide a refresh token such that during the valid time period for the refresh token, the management system 100 may obtain the access token from the service on behalf of the user without the user having to authenticate itself to the service again.

Figure 4:
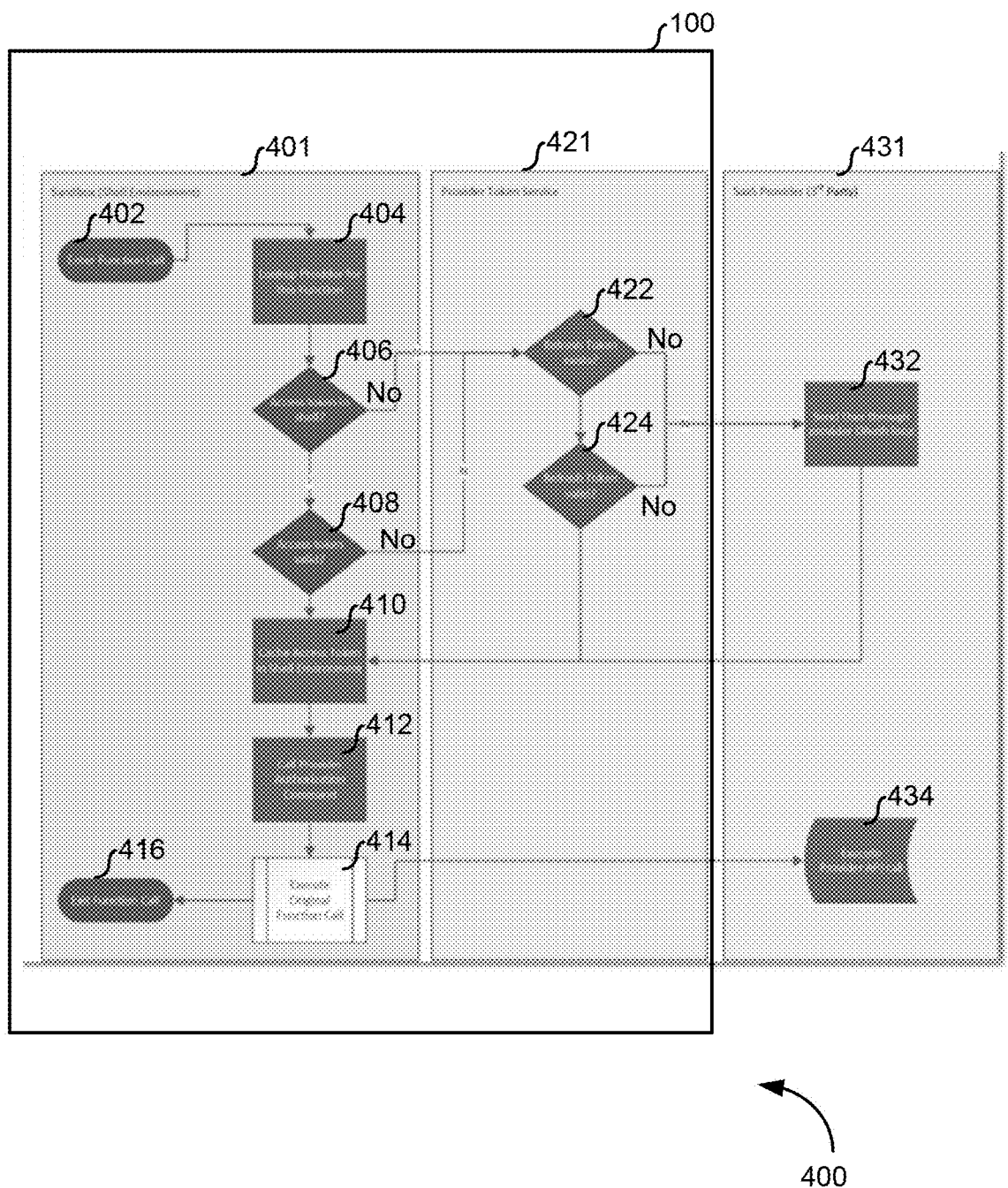
FIG. 4 shows another example method for just-in-time authentication of administrator or staff of an IT service end user according to one embodiment.

FIG. 4 shows another example method 400 for just-in-time authentication of administrator or staff of an IT service end user according to one embodiment. The example shown FIG. 4 includes more implementation details compared with the example method shown in FIG. 3. The implementations details in FIG. 4 should not be interpreted as limiting the scope of present disclosure. They are for illustrating one way of achieving the just-in-time authentication in accordance with the disclosure. Other ways for implementing just-in-time authentication in accordance with the disclosure are contemplated.

The operations of method 400 presented below are intended to be illustrative. In some embodiments, method 400 may be accomplished with one or more additional operations not described and/or without one or more of the operations discussed. Additionally, the order in which the operations of method 400 are illustrated in FIG. 4 and described below is not intended to be limiting.

In some embodiments, method 400 may be implemented in the management system 100 and/or one or more systems 104a-104n shown in FIG. 1, which may each include one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be designed for execution of one or more of the operations of method 400.

Figure 5:
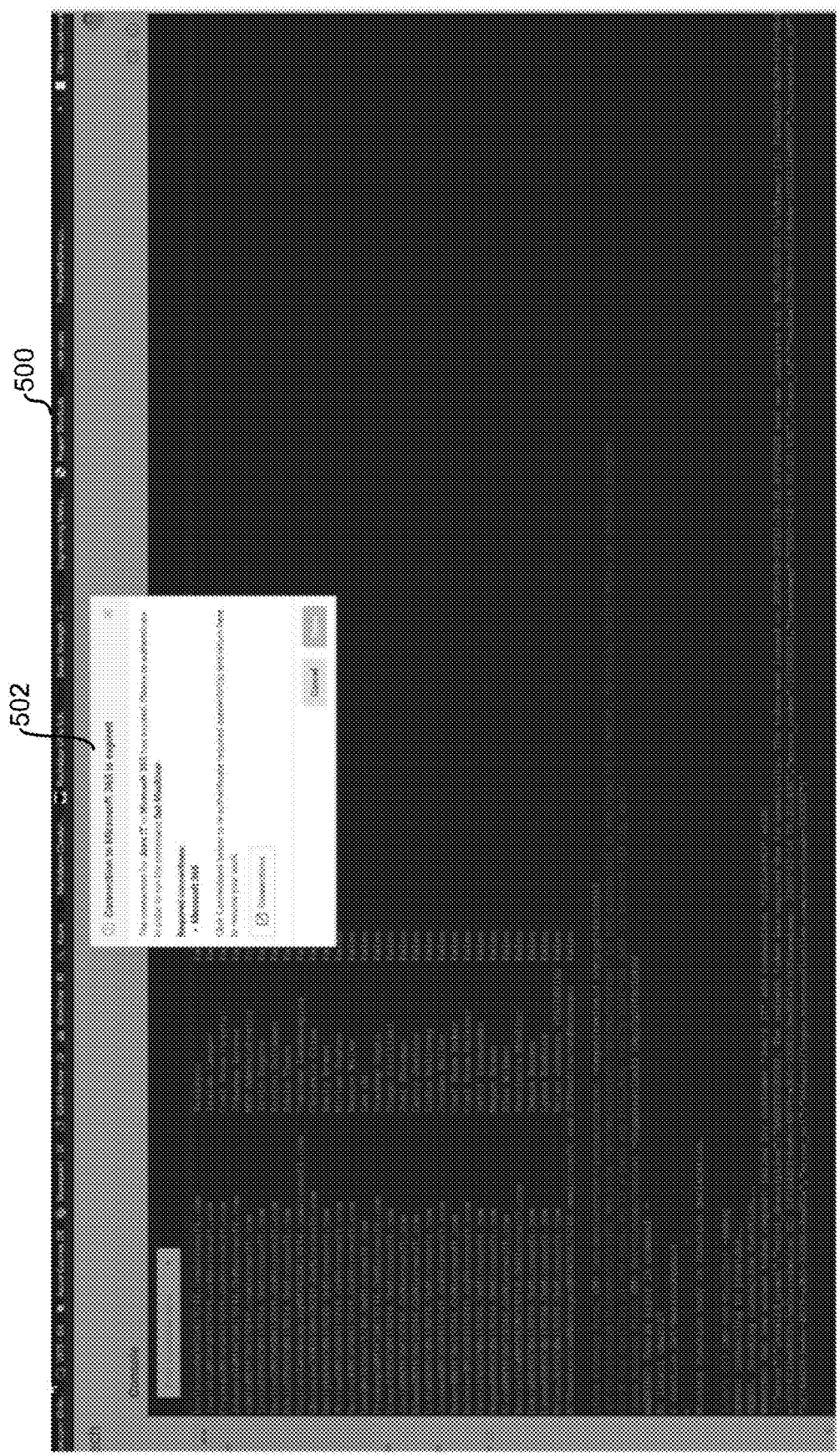
FIG. 5 shows an example interface illustrating just-in-time authentication of administrator or staff of an IT service end user according to the present disclosure.

In FIG. 4, 3 different layers are shown—a shell environment 401, a token service 421, and service provider 431. An example interface for the shell environment 401 is shown in FIG. 5. In implementation, the management system 100 may provide the shell environment such that the interface shown in FIG. 5 is presented to the user on a given terminal of the IT service end user 102, such as terminal 104a shown in FIG. 1. The token service 421 may also be implemented by management 100 to manage access to a particular service for the user. However, this is not necessarily the only case. In some implementations, the token service 421 may be provided by the service provider and/or any other third party provider.

At 402, a function call is entered in the shell environment 401. As mentioned above, the function call may be entered by the user manually in the shell environment through the interface shown in FIG. 5, or it may be entered as part of execution of a script run in the shell environment 402.

At 404, a service provider for the function call may be determined. As mentioned above, different ways may be used to determine the service provider for the function call. A service provider typically issues an access token or an ID token in response to a successful authentication. An access token issued by a service provider can be used to make authenticated calls to a secured API of the service, while the ID token contains user profile attributes represented in the form of claims. Typically, an access token or ID token has expiration date. Typically, the user needs a new access token when access the service for the first time during a session in shell environment 401, or after the previous access token granted to the user has expired.

At 406, an access token to the service is determined whether to be in the shell environment 406. As will be described below, the access token may be issued by the service previously when another function call to the service is invoked in the shell environment 401. In that case, since the user already has an active access to the service through the access token in the shell environment 401, there is no need to acquire active access again for executing the function call received at 402. Thus, if the access token already exists in the shell environment 401, the process proceeds to 408, where a validity of the access token in the shell environment 401 is examined. On the other hand, if it is determined that the access token to the service does not exist in shell environment 401, the process proceeds to 422 in the token service 421. That is, the token service 421 is called to determine whether a refresh token exists. As mentioned above, a refresh token is a special kind of token used to obtain a renewed access token. With a refresh token, new access tokens can be automatically requested to the service until the refresh token is blacklisted by the service. That is, if the refresh token exists in the token service 421, a new access token can be automatically requested to and granted by the service provider without the user having to authenticate itself again to the service provider.

Thus, the process proceeds to 422 when there is no access token in the shell environment 401 or the access token in the shell environment 401 is invalid as determined at 406 and 408 respectively. At the token service 421, the process checks if there is a valid refresh token (422 and 424), and if there is none, the process proceeds to 432.

At 432, the user is directed to an authentication mechanism provided by the service provided, such as an OAuth mechanism. FIG. 5 illustrates an example authentication mechanism provided by the service provider. As can be seen in that example, after the user enters a function call (get user from MS 365), the user is directed to authenticate itself through the OAuth interface provided by the MS 365 service. This is because management system 100 determines the shell environment 401 does not have a valid access token to MS 365, and there is no valid refresh token in the token service 421.

Attention is now directed to 410 in the shell environment 401 in FIG. 4, the process may proceed to 410 when there is valid access token in the shell environment 401 or an access token is acquired from the service (e.g., at 432) either through refresh token or user authentication. In any access, the access token may be continued or newly cached in the shell environment 401 for next function call to the service in the shell environment 401.

At 412, an authorization command is called to determine whether the access token is authorized to invoke the function call to the service provider. This operation ensures that the access token has sufficient privileges to invoke the function call entered at 402. If the user is not authorized by the IT service end user 102, the process will not execute the function call.

At 414, the process executes the function call entered at 402 by the user. This may involve one or more API calls to the service provider at 434. At 416, the process proceeds to an end.

Recursive Calling within Proxy Modules

In accordance with the present disclosure, a given proxy module may call another proxy module, which may in turn call yet another proxy module. For example, a first proxy module may be executed because a first command corresponding to the first proxy module is requested to be executed by a user within the IT service end user 102. The first command may in turn call a second command, which corresponds to a second proxy module in that example. The execution of the second proxy module is instigated inside the first proxy module. Because the second proxy module is executed within the first proxy module, the execution of the second proxy module should be consistent with the execution of the first proxy module. For example, both executions should have the same aspect-oriented behavior (e.g., retaining state, logging their execution/results, etc.). In implementations, techniques may be developed to ensure such consistency. For example, if a user is trusted to execute the first command only to some extent, the execution of the second command within the first proxy module should ensure that the execution of the second command does not exceed that extent. This may involve the first proxy module passing an execution limitation to the second proxy module, which may execute the second command accordingly.

III. Granular Permission

As mentioned above, a user within the IT service end user 102 may be assigned to permissions to certain commands/resources to a given service. Traditionally, the IT service end user 102 typically has a super user power when providing IT service to a given customer. For example, the IT service end user 102 can execute any commands and/or access any resources within the given service—such as delete all users. However, within the IT service end user 102, administrator or staff may have different levels of experiences. Some may be less advanced than others, especially those who are relatively new or junior within the IT service end user 102. Thus, empowering those users with super user power to execute any commands and/or access any resources within the given service may not be desirable for the IT service end user 102 and/or the given customer.

One insight provided by the present disclosure is that permissions to execute commands or access resources within a given service by a user for a given customer within the IT service end user 102 can be managed and controlled. Commands or resources may be categorized into different groups according to levels—for example, read/write, write-only, read-only, and/or any other groups. A concept called securable is introduced to commands/resources within the given service for the given customer such that users within the IT service end user 102 are assigned specific permissions to execute those commands or access those resources. Securable (such as commands or resources within the given service) can be tracked by the management system 100. When a command is executed or a resource is accessed by a user within the IT service end user 102, management system 100 determines whether this user has a permission to execute this command or access this resource for the given customer. It should be understood that this layer of securable exists in the management system 100. Any given service provider (such as MS 365) may independently implement controlled access mechanism to resources within the given service. However, as mentioned, that may not be sufficient to safeguard against different levels of experiences within a super user such as the IT service end user 102. Thus, in accordance with the present disclosure, the layer of securable is implemented for the IT service end user 102 to provide it flexibility and controllability in terms of managing its own staff when providing IT service to across customers of the IT service end user 102.

In accordance with the present disclosure, commands to a given service may comprise at least two types—provider commands or customized commands. Provider commands are typically provided by a service provider, such as MS 365, Dropbox, etc. These commands may be published as standard API calls by the service provider for accessing/creating/managing resources within a given service provided by the service provider. Customized commands may be developed by a third party such as the IT service end user 102 or the provider of the management system 100. One example of customized commands may include scripts authored by the IT service end user 102 for automating one or more tasks within the given service. However, this is not necessarily the only case. Another example of customized commands may include wrap-around commands, which may be created by wrapping around corresponding provider commands for providing extra intelligence when executing the provider commands—such as the proxy module mentioned above.

In one example, intelligence may be developed in a given proxy module corresponding to a command to safeguard against executing this command without restrictions. Typically, the IT service end user 102 is given super user power to execute the command. As mentioned herein, users within the IT service end user 102 may have different levels of experiences. Therefore it may be desirable to build intelligence within the given proxy module to check whether a user within the IT service end user 102, who is invoking the command, has an authority to execute this command or whether there is a restriction on this user to execute command. Example of such a restriction may include the user may be authorized to use this command to change certain data within the given service depending a role of this user. For example, MS 365 Set-User command has multiple data properties. A proxy module for this command may be developed and configured with intelligence focusing on some (but not all) specific properties in that command that serve a discrete business function intended for certain users.

In accordance with the present disclosure, resources within a given services may comprise entities, documents, information, and/or any other types of resources. For example, one type of resources is user information for individual users of the customer in the service. Another type of resource is license information for one or more licenses associated with the customer in the service. Still another type of resource is user group information for the customer within the service. Other types of resources are contemplated.

Figure 6:
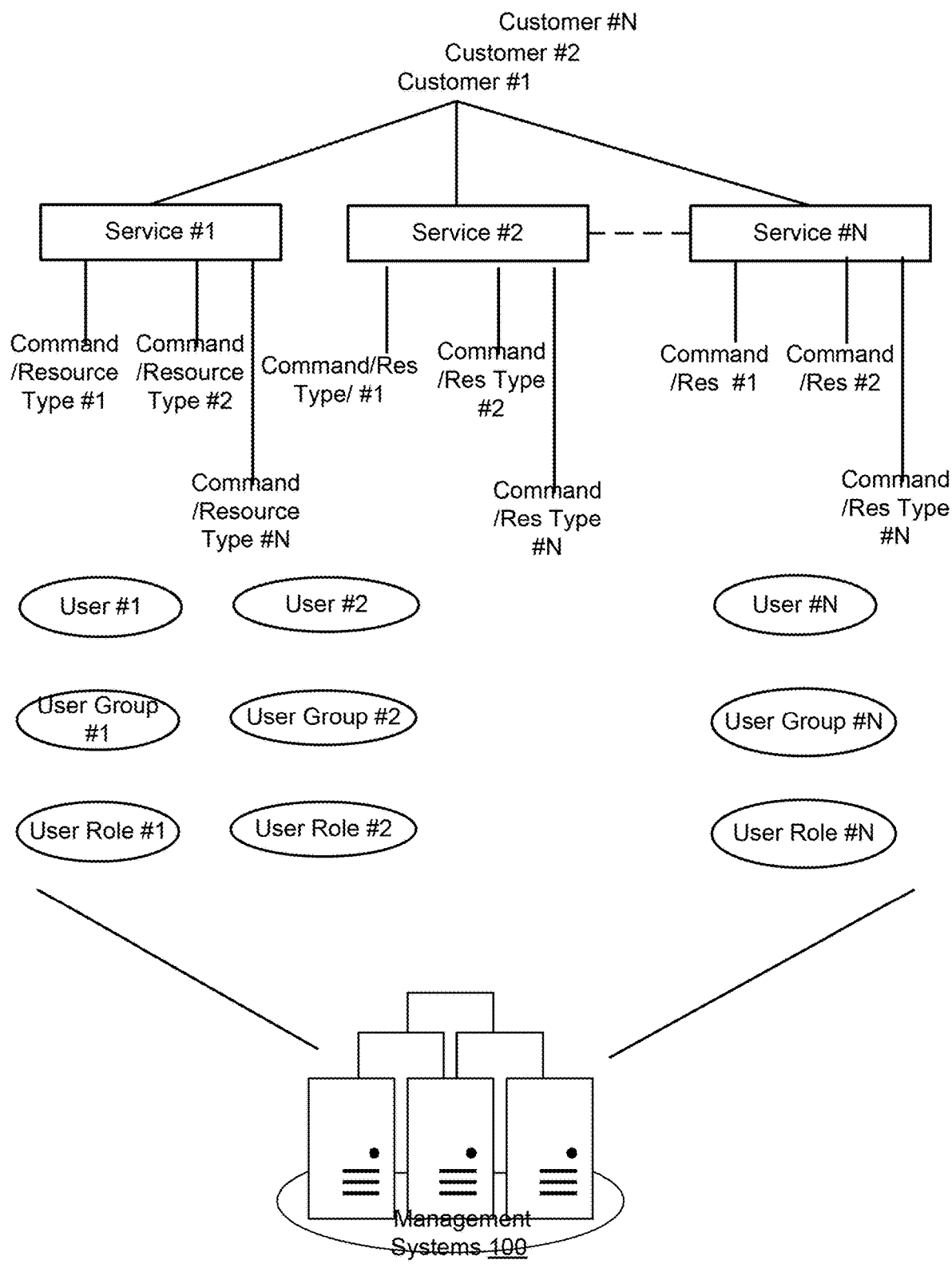
FIG. 6 illustrates an embodiment of implementing an access matrix for achieving securable within managing system in accordance with the disclosure.

FIG. 6 illustrates one embodiment of implementing an access matrix for achieving securable within managing system 100 in accordance with the disclosure. As shown in FIG. 6, various constructs or entities may be implemented within management system 100 and an access matrix may be established amongst them in accordance with the description below. For instance, a database may be used in implementation to establish the access matrix for the securable commands.

At the very top of the access matrix are the customers. As also illustrated and described in FIG. 2, an individual customer of the IT service end user 102, such as customer #1, may employ multiple services such as service #1 (e.g., MS 365), service #2 (e.g., Dropbox), service #N (e.g., Gmail), and/or any other services. For the individual service, commands (provider or customized commands) and/or resources may be available for the IT service end user 102 to access/create/manage within the service on behalf the customer. These commands/resources may be categorized according to their security sensitivity levels. In one implementation, without limitation, these commands/resources are categorized into command/resources type #1 (e.g., commands that can read from/write to the service, or resources that can be read/written within the service), command/resource type #2 (e.g., commands that can only write to the service or resources that can only be written to within the service), command/resource type #N (e.g., commands that can only read from the service or resource that can only be read within the service), and/or any other types of commands/resources. As shown, individual services may have their own categorized commands/resources, which do not have to be categorized in a same way. For example, one set of criteria may be used to categorize commands/resources in service #1, and another set of criteria may be used to categorize commands/resources in service #2, and still another set of criteria may be used to categorize commands/resources in service #N. Different customers may also have different criteria or rules for categorizing their commands/resources to/within a given service. For example, customer #1 may have a first set of criteria to categorize commands in service #1, and customer #2 may have a second set of criteria to categorize commands in service #2 such that the first set of criteria and second set of criteria do not have to be the same. As mentioned, the aforementioned relationships among customers, services and commands/resources can be implemented by management system 100 through a database, such as a relational database, a graph database, and/or any other types of databases.

As also shown in FIG. 6, users, such as user #1, user #2, and user #N shown, within the IT service end user 102 may be assigned permissions to execute commands or access resources of a given service for a given customer. Such a permission may be assigned to an individual user within the IT service end user 102 either directly or indirectly. In the case of direct assignment of such a permission, an individual user, such as user #1, may be assigned directly permission to execute commands or access resources of type #2 in service #1, but no permission to execute commands or access resources of type #1 in service #1; permission to execute commands of type #N in service #2 but no permission to execute other types of commands in service #2; and so on. This granular or ala-carte direct permission assignment to an individual user within the IT service end user 102 can also be applied to different customers. For example, user #1 is assigned permission to execute commands of type #1 in service #N for customer #1, but no permission to execute commands of type #1 in service #N for customer #2. In this way, granular user permission to execute commands or access resources across different services for different customers can be achieved within the IT service end user 102.

Another way of assigning granular permission to a user within the IT service end user 102 is through indirect assignment. This is also shown in FIG. 6. For example, user groups may be established within the IT service end user 102, and permissions to execute a specific type of commands or access a specific type of resource within a given service for a given customer may be assigned to individual user groups. Users may be added or removed from these groups to give them such permissions indirectly. Another way is to establish user roles within the IT service end user 102. The above-mentioned permissions can be assigned to individual user roles, and individual users may be assigned to different roles to assume such permissions. In this way, access to any service provider could be tuned to specific users or roles independently of the permission system of the service provider and furthermore could be limited or expanded into custom logical constructs that sit outside of the service provider.

Figure 7:
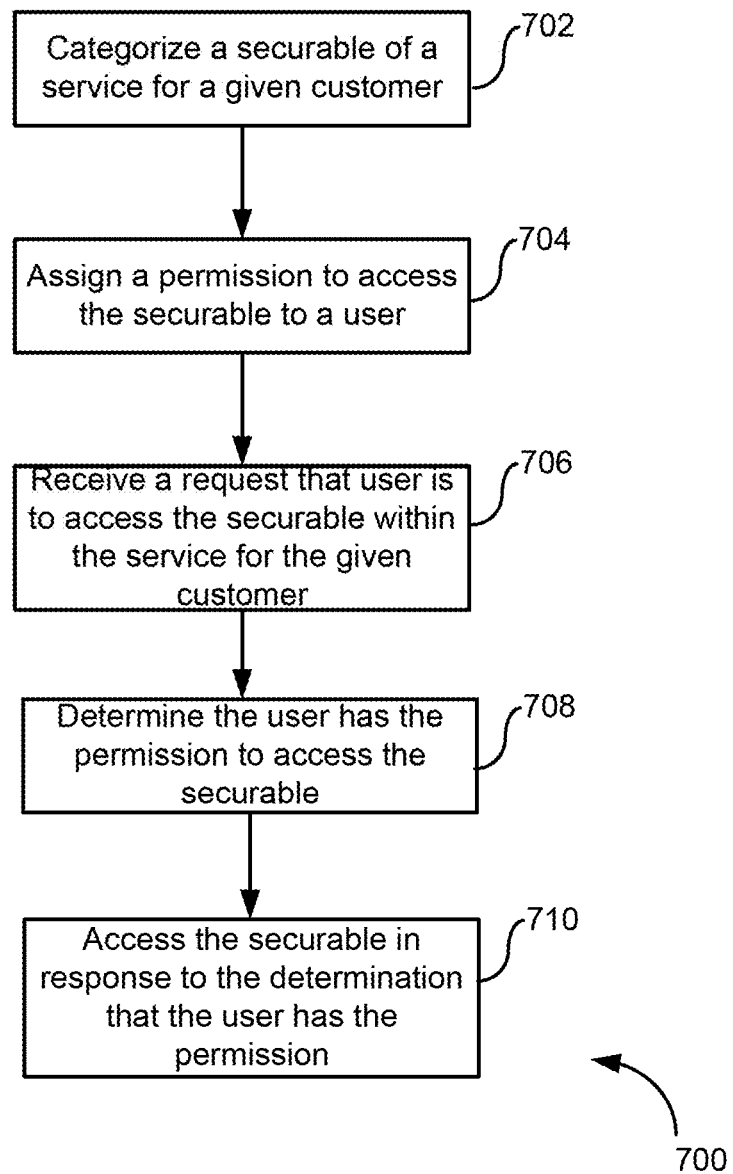
FIG. 7 illustrates an example method for a user within the IT service end user to access a securable within a service for a given customer in accordance with the disclosure

FIG. 7 illustrates an example method 700 for a user within the IT service end user 102 to access a securable within a service for a given customer in accordance with the disclosure. The operations of method 700 presented below are intended to be illustrative. In some embodiments, method 700 may be accomplished with one or more additional operations not described and/or without one or more of the operations discussed. Additionally, the order in which the operations of method 700 are illustrated in FIG. 3 and described below is not intended to be limiting.

In some embodiments, method 700 may be implemented in the management system 100 and/or one or more systems 104a-104n shown in FIG. 1, which may each include one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be designed for execution of one or more of the operations of method 700.

At 702, a securable of a given service for a given customer can be categorized. As descried herein, a securable at management system 100 side may comprise commands, resources, and/or any other entities, a provider of the management system 100 would like to secure for the IT service end user. The securable may be implemented through a database by the management system 100, such as a relational database or graph database mentioned above. An example implementation of the securable is illustrated in FIG. 6.

At 704, a permission is assigned to a user within the IT service end user 102. As mentioned above, the permission may be assigned to the user directly or indirectly. In the case of indirect assignment, constructs such as user groups, and/or user roles may be created for the IT service end user 102 in management system 100. As also illustrated and described in association with FIG. 6, the permission assigned to the user is granular in a sense that the permission may be carte blanche into specific types of securable for specific service employed by a specific customer. Examples of such a permission is described above in association with FIG. 6.

At 706, a request to access the securable within the service for a given customer can be received from a user of the IT service end user 102. The request may be received from an interface such as the one shown in FIG. 5, or it may be received from execution of a script. The securable requested at 706 may involve an execution of a command within the service for the given customer or access a resource within the service for the given customer.

At 708, it is determined that user has the permission to access the securable requested at 706. It should be understood, the operation(s) at 708 may be independent from the authentication described herein that involves acquiring active access from the service. 708 is an additional authorization in a sense, even if the IT service end user 102 has an active access to the service to execute any commands or access any resources within the service, 708 is still run to ensure the user within the IT service end user 102 is permitted to access the securable requested 708. As mentioned herein, this provides the IT service end user 102 an ability to manage and control its staff to execute commands and/or access resources within the service.

At 710, in response to the determination that the user has a permission to access the securable requested at 706, the securable is accessed by the management system 100. For example, the securable is a command, the execution of the command is realized at 710.

IV. Stateful Execution of a Command

With just-time-authentication and granular permission having been described, attention is now directed another set of features in accordance with the present disclosure. This set of features relates to the execution of a command to a service. In this set of features, the execution state of the command may be recorded for future execution of the command. In IT servicing by the IT service end user 102 to a given customer, commands and/or scripts are typically executed repeatedly at different times. For example, the IT service end user 102 may need to run a script on a nightly basis to maintain account services of the given customer, and execution of a certain portion of the script may be the same every night in terms of inputs and outputs. In another case, script execution may be halted in the middle of execution due to exceptions/faults or requiring user input. Execution of the same scripts would thus have to be restarted after the exceptions or faults are fixed.

Traditionally, systems that facilitate command execution to a service typically do not record a state of previous execution of the command. Thus, when the same command is executed subsequently, the command is fully executed (e.g., making calls to the service and causing the service to perform some actions) even though outputs of the same command may be available from previous executions. One insight provided by the present disclosure is that a state of an execution of a command may be stored. If another execution of the same command is requested subsequently, the stored state of the command in the previous run is checked to determine if an output of the command from the previous run can be used instead of having the service provider run the command to provide the output.

One benefit of stateful execution of a command in accordance with the disclosure is that it may address the problem that workflows are not inherently idempotent. Subsequent executions of a non-idempotent, non-stateful workflow would result in undesirable results and potentially further errors. By preserving the state of the previous steps of the workflow, execution of a command may be continued at where it was terminated in a previous run. This can avoid any side-effects of repeated executions of the previously successful steps. This can also avoid server trips and/or repeated execution of the same command/function call to the service, and thus improve efficiency in providing IT service to a customer of the IT service end user.

Figure 8:
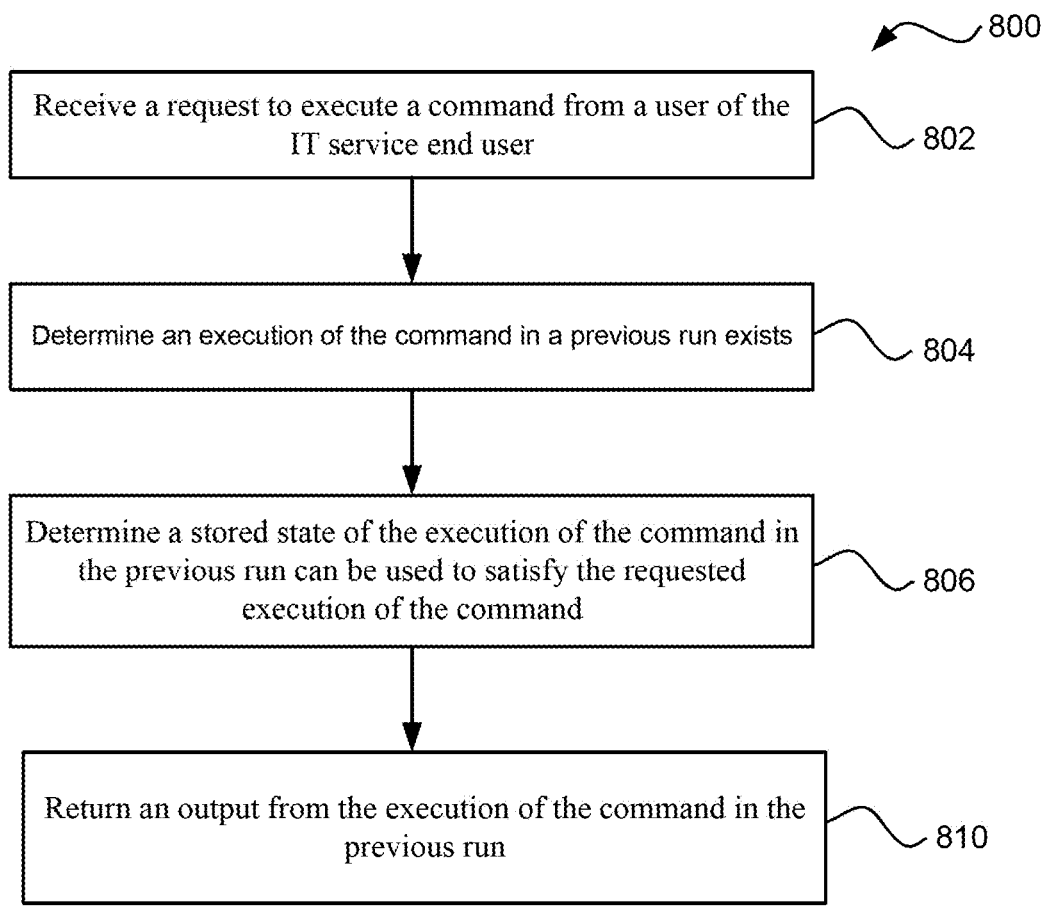
FIG. 8 shows an example method for facilitating stateful command execution in accordance with the disclosure.

FIG. 8 shows an example method 800 for facilitating stateful command execution in accordance with the disclosure. The operations of method 800 presented below are intended to be illustrative. In some embodiments, method 800 may be accomplished with one or more additional operations not described and/or without one or more of the operations discussed. Additionally, the order in which the operations of method 800 are illustrated in FIG. 8 and described below is not intended to be limiting.

In some embodiments, method 800 may be implemented in the management system 100 and/or one or more systems 104a-104n shown in FIG. 1, which may each include one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be designed for execution of one or more of the operations of method 800.

At 802, a request to execute a command from a user of the IT service end user 102 can be received. As mentioned, the request may be received from an interface such as the one shown in FIG. 5, or it may be received from execution of a script.

At 804, in response to the command execution request being received at 802, an execution of the same command in a previous run is determined to exist. As mentioned above, the script may have been run previously and halted in the middle due to some exception. After the exception is fixed, the user requests to run the script again. Because the command has already been executed in the previous run of the script, an output of the command may exist.

At 806, a stored state of the execution of the command in the previous run is determined to be usable to satisfy the execution of the command requested at 802. In implementations, 806 may be implemented as a safeguard against various situations. For example, between a previous run and a current run of the command, data at the service may have already changed. In that case, the command may have to be re-executed in the current run to account for the changed data at the service. Thus, even though the same command is requested to be executed, output of the command from the previous run may not be used. In this sense, a state of the command in the previous run should be checked before determining the execution of the command in the current can be skipped. As will be described in detail below, a state of the command in the previous run may include various factors such as execution count, session IDs, hash parameters, and/or any other factors. These factors can be used to determine whether the execution of the command requested at 802 can be skipped.

At 810, after the state of the command execution in the previous run is verified to be suitable for the command execution requested at 802, the output of the command execution from the previous run can be returned so that the execution of the command requested at 802 can be skipped.

In various implementations, the aforementioned proxy module corresponding to a given command for a service is implemented on the management system 100. In those implementations, as mentioned, once a command is received by the management system 100, a corresponding proxy module is determined to substitute the command. Within the proxy module, intelligence may be configured to implement the stateful execution of the command. In some implementations, the intelligence may involve generating or receiving a session ID to be associated with an execution of the command. One insight provided by the present disclosure is that an execution of a command may be sessionized to distinguish execution of the same command at different time points. A session ID of the command may be used to identify a particular state of an execution of the command at a specific time point. For example, execution of a command at a first time point may have a first session ID, and execution of the same command at a second time point may have a second session ID. Thus, the first session ID may identify execution of the command at the first time point that rendered a first output, and the second session ID may identify execution of the same command at the second time point that rendered a second output. In some situations, the first output may be different from the second output, even though they are both results from execution of the same command. This difference between outputs of the same command at different time points may be due to state change or circumstance change at the service provider. For example, a "get user" command for MS 365 may return different lists of users when run at different times because the state of (i.e., number of users in) MS 365 may have changed.

In some embodiments, the intelligence configured into the proxy module may involve creating a key comprising the session id, command name, count of command executions for a current session, hash of input parameters for the command, and/or any other factors. The intelligence may then check if that key matches any stored output from a prior execution of the command. If a match is found, the intelligence may return the output. If that key doesn't match any prior key, the intelligence may execute the command as normal and the output is saved by the key prior to returning.

In some embodiments, a state of a command execution may include at least 3 types of states: never run, partially run, or completed. In the "never run" state, the command may not have run at the time point as identified by the session ID associated with the command. This may be due to an exception that occurred before the command was about to be executed. For example, in the case of authentication exception, when a script is run automatically without user intervention, a prompt, such as that shown in FIG. 5, may not be attended to by the user to provide credentials in order for the management system to obtain an access token, and thus the command is not executed for lack of authorization. In that case, a state of "never run" is recorded to show the command was not run at the time point identified by the session ID associated with the command.

In the state "partially run", the execution of command may stop at some point before the execution of command is successfully completed. This may occur when a fault or exception occurred in the middle of the execution of the command. For example, certain hardware faults may occur on the provider side of the service in the middle of the execution of the command. In that case, some output from the execution may be stored on the management system 100.

In the state of "completed", the execution of command runs to a successful completion. In this state, subroutines (if any) in the command may recorded by management system 100 and final output may be stored. If the execution of the command is "completed", the stored output of that execution of the command may be used in a subsequent execution of the command.

Figure 9:
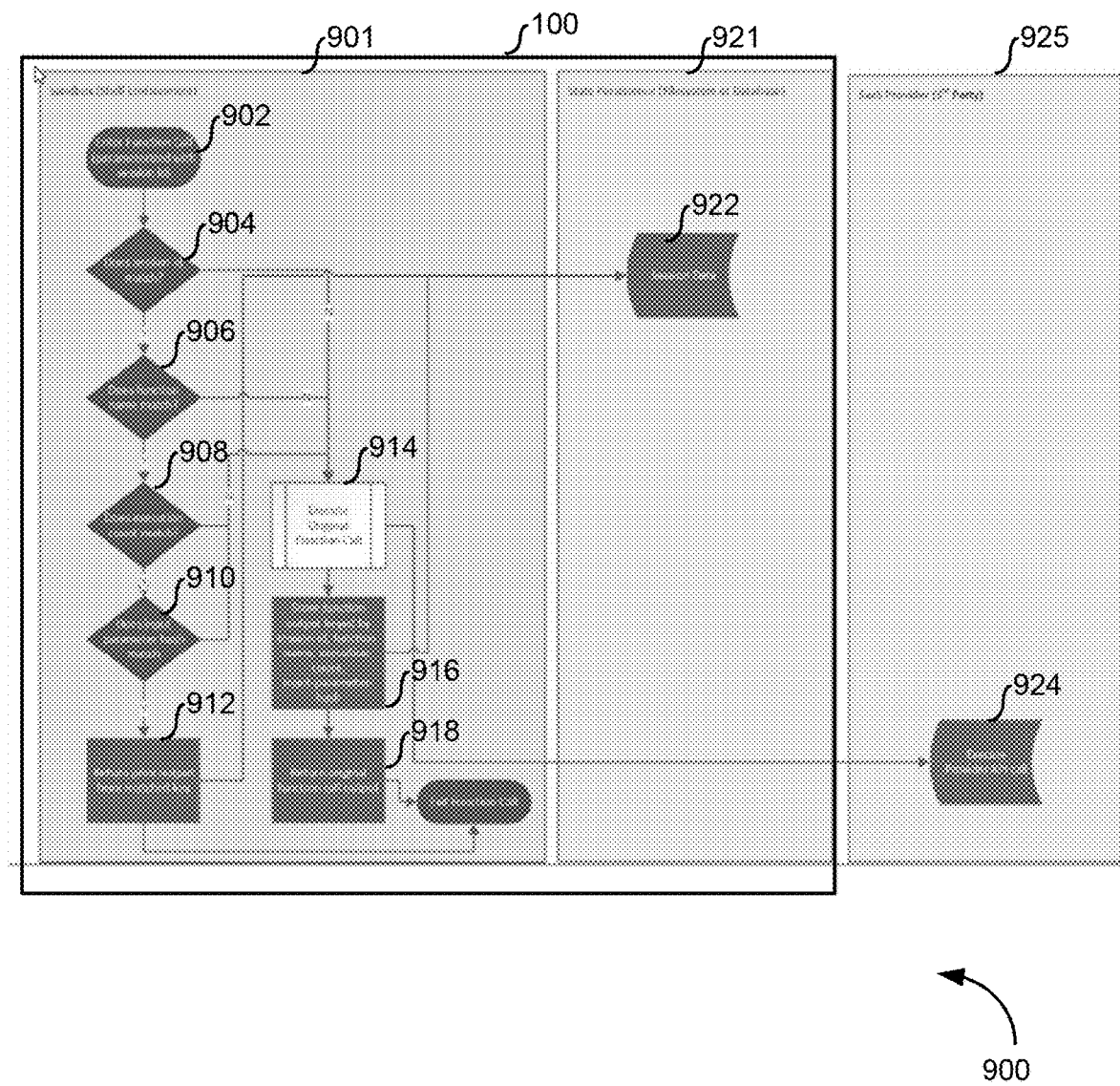
FIG. 9 shows another example method for facilitating stateful execution of a command in accordance with one embodiment.

FIG. 9 shows another example method 900 for facilitating stateful execution of a command in accordance with one embodiment. The example shown FIG. 9 includes more implementation details compared with the example method shown in FIG. 8. The implementations details in FIG. 9 should not be interpreted as limiting the scope of present disclosure. They are for illustrating one way of achieving the stateful execution of the command in accordance with the disclosure. Other ways are contemplated.

The operations of method 900 presented below are intended to be illustrative. In some embodiments, method 900 may be accomplished with one or more additional operations not described and/or without one or more of the operations discussed. Additionally, the order in which the operations of method 900 are illustrated in FIG. 9 and described below is not intended to be limiting.

In some embodiments, method 900 may be implemented in the management system 100 and/or one or more systems 104a-104n shown in FIG. 1, which may each include one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be designed for execution of one or more of the operations of method 900.

In FIG. 9, 3 different layers are shown—a shell environment 901, a session service 921, and service provider 925.

An example interface for the shell environment 901 is shown in FIG. 5. In implementation, the management system 100 may provide the shell environment such that the interface shown in FIG. 5 is presented to the user on a given terminal of the IT service end user 102, such as terminal 104*a* shown in FIG. 1. The session service 921 may also be implemented by management 100 to manage states of execution of commands over time. However, this is not necessarily the only case. In some implementations, the session service 921 may be provided by the service provider and/or any other third party provider.

At 902, function call is entered in the shell environment 901. As mentioned above, the function call may be entered by the user manually in the shell environment through the interface shown in FIG. 5, or it may be entered as part of execution of a script run in the shell environment 402.

At 904, a session ID of the function call is checked to determine if it matches any prior execution of the function call. As mentioned above, a function call may be associated with session ID, which may be generated or supplied by the user. When the session ID is not supplied by the user, it may be generate by the management system 100 to identify this execution of the command through the session ID. When the user supplies the session ID, this means the user desires to re-run the same command with the same session ID that was executed previously. In this case, the process proceeds to 922 inside the session service 921. The session service 921 may be implemented by management system 100 through a database to record individual execution of the commands at different points of times as identified by the session IDs associated with those executions.

At 922, relevant session data may be checked and returned to shell environment 901. At 904, the session data is checked to see if the session ID associated with the command execution requested at 902 matches any one of the session IDs in the previous runs stored by the session service 921. If no match is found, the process proceeds to 914 to execute the function call, which may involve a server trip to the service provider 925 for executing the command at 924. If a match is found, the process proceeds to 906.

At 906, the name of the function call requested at 902 is checked to see if the same function call with the same session ID was run previously. If no match is found, the process proceeds to 914 to execute the function call at the service. If a match is found, the process proceeds to 908.

At 908, an execution count of the function call requested 902 is checked to see if the same function call run previously (as determined by 904 and 906) has a same execution count. Execution count for a function call can be used to identify an order in which the function call is invoked, for example in a script. A same function call may be invoked in the script multiple times. For example, a function call "create user" may be invoked 10 times in a script to create 10 different users in the service. In that case, the first invocation of "creating user" in the script is different from the second invocation of the "creating user" in the script. Thus, there should be another layer of identification to distinguish them because all of the invocations of "creating user" in the script have the same session ID and same function name. Execution count is introduced to address this. In the example above, the first invocation of "creating user" will have execution count 1, the second invocation will have execution count 2, third invocation will have execution count 3, and so on. In this way, replay of the previous execution of the command can be precise to the level of their order inside a script.

At 910, input parameter to the function call is checked to determine if the identified previous execution of the same function call (as determined by 904, 906, 908) may also have those same parameters. This check is to safeguard against previous function calls with different parameters even when it has the same session ID, function name, and execution count as determined by 904, 906, and 908. Take the create user script for example, the current run of the script, the user may have made a change to a fourth invocation of "creating user" command to create a different user from the previous version of the script. In that case, the parameter(s) to the function call should be checked to ensure a previous run of the same command but with different parameters will not be used to skip the function call requested at 902. If both 908 and 910 match, the process proceeds to 921, where the matched function call from the previous execution is returned for the function call execution requested at 902. On the other hand, if not match is found in either of 908 or 910, the process proceeds to 914, where the function call requested at 902 is executed.

At 916, the function call is executed by the service and result is returned to shell environment 901. At 916, a state of this execution is recorded into the session service 921. As shown, this may involve generating a key comprising a session ID, a function name, an execution count, input parameter(s) and/or any other factors to identify this execution of the function call. At 918, the output of the execution at 914 is returned to the user.

V. Computer System

Figure 10:
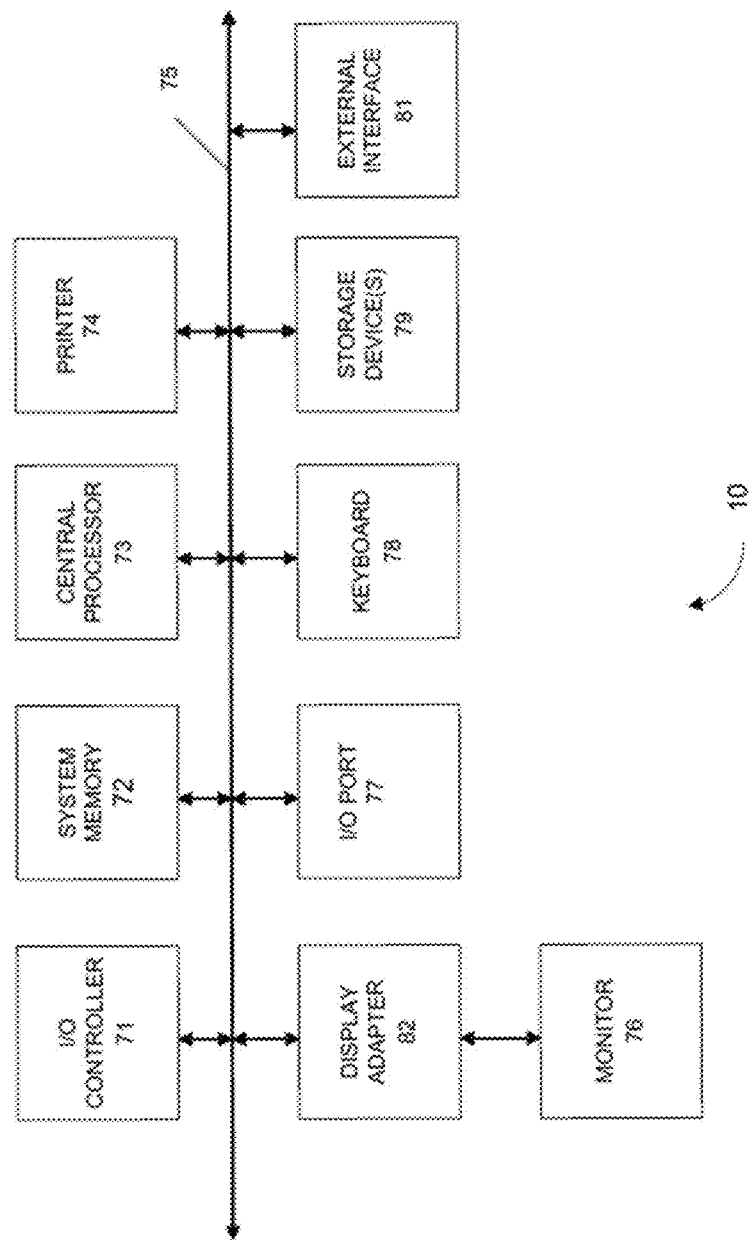
FIG. 10 shows an example computer apparatus for implementing various embodiments in accordance with the disclosure.

Any of the computer systems mentioned herein may utilize any suitable number of subsystems. Examples of such subsystems are shown in FIG. 10 in computer system 10, which can be configured to implement various features and/or functions described herein. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 10 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method for facilitating service administration, the method being implemented by one or more computer servers and comprising:
   receiving a request to execute a command to a service for a customer from a user;
   determining whether the user has an active access to the service;
   in response to the user not having an active access to the service, acquiring the active access to the service;
   determining whether the user is authorized to execute the command to the service for the customer in response to the active access to the service is acquired for the user; and
   in response to the determination that the user is authorized to execute the command, generate another request to execute the command to the service.

2. The method of claim 1, wherein the determining whether the user has the active access to the service comprises:
   determining whether a valid access token issued by the service exists;
   in response to a determination that the valid access token does not exist, determining whether a valid refresh token to the service exists; and
   in response to a determination the valid refresh token does not exist, directing the user to an authentication mechanism provided by the service.

3. The method of claim 2, further comprising:
   in response to a determination the valid refresh token exists, acquiring a new valid access token from the service using the refresh token.

4. The method of claim 1, wherein determining whether the user is authorized to execute the command to the service for the customer comprises:
   determining, from an access matrix, whether the user is assigned a permission to execute the command to the service for the customer, wherein the access matrix comprises multiple customers, each of the multiple customers employing multiple services, each of the multiple services comprises multiple command, wherein the command to the service for the customer is a first command to a first service for a first customer, and wherein the access matrix comprises a permission for the users to a second command to the first service for the first customer, wherein the user has the permission to execute the first command, and does not have the permission to execute the second command.

5. The method of claim 4, wherein the access matrix further comprises a permission for the user to execute a third command in a second service for the first customer.

6. The method of claim 4, wherein the access matrix further comprises a permission for the user to execute a fourth command in the first service for a second customer, but does not comprise a permission for the user execute the four command in the first service for the first customer.

7. The method of claim 1, further comprising:
determining whether execution of the command performed in the previous run matches the requested execution of the command; and
in response to a determination that the command was executed in the previous run, obtain an output from the command execution from the previous run and skip executing the command.

8. The method claim 7, further comprising:
generating a key to identify a given execution of a given command, wherein the key comprises information indicating a session ID, a function name, an execution count, and one or more input parameters.

9. The method of claim 8, wherein determining whether execution of the command performed in the previous run matches the requested execution of the command comprises:
obtaining a key of the execution of the command in the previous run;
determine whether the generated key matches the key of the execution of the command in the previous run; and
in response to determining a key match, determining that the execution of the command performed in the previous run matches the requested execution of the command.

10. A computer system configured to retrieve information for service administration, the computer system comprising one or more electronic processor configured to execute machine-readable instructions to cause the computer system to perform:
receiving request to execute a command to a service for a customer from a user;
determining whether the user has an active access to the service;
in response to the user not having an active access to the service, acquiring the active access to the service;
determining whether the user is authorized to execute the command to the service for the customer in response to the active access to the service is acquired for the user; and
in response to the determination that the user is authorized to execute the command, generate another request to execute the command to the service.

11. The computer system of claim 10 is further caused to perform:
determining whether a valid access token issued by the service exists;
in response to a determination that the valid access token does not exist, determining whether a valid refresh token to the service exists; and
in response to a determination the valid refresh token does not exist, directing the user to an authentication mechanism provided by the service.

12. The computer system of claim 11 is further caused to perform:
in response to a determination the valid refresh token exists, acquiring a new valid access token from the service using the refresh token.

13. The computer system of claim 10, wherein determining whether the user is authorized to execute the command to the service for the customer comprises:
determining, from an access matrix, whether the user is assigned a permission to execute the command to the service for the customer, wherein the access matrix comprises multiple customers, each of the multiple customers employing multiple services, each of the multiple services comprises multiple commands, wherein the command to the service for the customer is a first command to a first service for a first customer, and wherein the access matrix comprises a permission for the users to a second command to the first service for the first customer, wherein the user has the permission to execute the first command, and does not have the permission to execute the second command.

14. The computer system of claim 13, wherein the access matrix further comprises a permission for the user to execute a third command in a second service for the first customer.

15. The computer system of claim 13, wherein the access matrix further comprises a permission for the user to execute a fourth command in the first service for a second customer, but does not comprise a permission for the user execute the four command in the first service for the first customer.

16. The computer system of claim 10 is further caused to perform:
determining whether execution of the command performed in the previous run matches the requested execution of the command; and
in response to a determination that the command was executed in the previous run, obtain an output from the command execution from the previous run and skip executing the command.

17. The computer system of claim 16 is further caused to perform:
generating a key to identify a given execution of a given command, wherein the key comprises information indicating a session ID, a function name, an execution count, and one or more input parameters.

18. The computer system of claim 17, wherein determining whether execution of the command performed in the previous run matches the requested execution of the command comprises:
obtaining a key of the execution of the command in the previous run;
determine whether the generated key matches the key of the execution of the command in the previous run; and
in response to determining a key match, determining that the execution of the command performed in the previous run matches the requested execution of the command.

* * * * *

UNITED STATES PATENT AND TRADEMARK OFFICE
CERTIFICATE OF CORRECTION

| | | |
|---|---|---|
| PATENT NO. | : 11,741,410 B2 | Page 1 of 1 |
| APPLICATION NO. | : 17/152780 | |
| DATED | : August 29, 2023 | |
| INVENTOR(S) | : Christopher Rayner et al. | |

It is certified that error appears in the above-identified patent and that said Letters Patent is hereby corrected as shown below:

On the Title Page

Item (72):
Replace Inventor name "Philip Pittie" with "Philip Pittle"

Signed and Sealed this
Fourteenth Day of November, 2023

*Katherine Kelly Vidal*

Katherine Kelly Vidal
*Director of the United States Patent and Trademark Office*